(12) United States Patent
Doki

(10) Patent No.: US 11,181,086 B2
(45) Date of Patent: Nov. 23, 2021

(54) VEHICLE CONTROL APPARATUS

(71) Applicant: SUBARU CORPORATION, Tokyo (JP)

(72) Inventor: Atsushi Doki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 144 days.

(21) Appl. No.: 16/657,441

(22) Filed: Oct. 18, 2019

(65) Prior Publication Data

US 2020/0149503 A1  May 14, 2020

(30) Foreign Application Priority Data

Nov. 12, 2018 (JP) .............................. JP2018-211972

(51) Int. Cl.
F02N 11/08 (2006.01)

(52) U.S. Cl.
CPC ...... F02N 11/0822 (2013.01); F02N 11/0833 (2013.01); *F02N 2200/0801* (2013.01); *F02N 2200/0815* (2013.01); *F02N 2200/106* (2013.01)

(58) Field of Classification Search
CPC ............. F02N 11/0822; F02N 11/0833; F02N 2200/106; F02N 2200/0815; F02N 2200/0801; F02N 2200/061; F02N 11/0818; F02N 11/0803; Y02T 10/40
See application file for complete search history.

(56) References Cited

U.S. PATENT DOCUMENTS

| | | | | |
|---|---|---|---|---|
| 2012/0310515 A1* | 12/2012 | Kirshon | ............. | F02N 11/0822 701/112 |
| 2014/0365032 A1* | 12/2014 | Park | .................. | G07C 9/00182 701/2 |
| 2015/0226146 A1* | 8/2015 | Elwart | ................. | B60W 30/06 701/49 |
| 2020/0102874 A1* | 4/2020 | Kurtz | ..................... | F02D 29/02 |

FOREIGN PATENT DOCUMENTS

| | | |
|---|---|---|
| JP | 2013-099029 A | 5/2013 |
| JP | 2014-202298 A | 10/2014 |

* cited by examiner

*Primary Examiner* — Sizo B Vilakazi
(74) *Attorney, Agent, or Firm* — McGinn I. P. Law Group, PLLC.

(57) ABSTRACT

A vehicle control apparatus for a vehicle provided with an engine and an electric motor includes a vehicle state evaluator, an exit evaluator, a shutdown evaluator, and a request output unit. The vehicle state evaluator conducts a vehicle stop evaluation and a driving state evaluation on the engine. The vehicle state evaluator evaluates whether the vehicle is stopped in a ready-on state in the vehicle stop evaluation. The exit evaluator conducts an exit evaluation as to whether an exit of an occupant from the vehicle is detected. The shutdown evaluator conducts a shutdown evaluation as to whether a vehicle drive system is to be shut down based on the results of the vehicle stop evaluation, the driving state evaluation, and the exit evaluation. The request output unit outputs a request for shutting down the vehicle drive system based on the result of the shutdown evaluation.

20 Claims, 7 Drawing Sheets

VEHICLE CONTROL APPARATUS

CROSS-REFERENCE TO RELATED APPLICATIONS

The present application claims priority from Japanese Patent Application No. 2018-211972 filed on Nov. 12, 2018, the entire contents of which are hereby incorporated by reference.

BACKGROUND

The technology relates to a vehicle control apparatus for a hybrid vehicle, in particular, to a shutdown control of a vehicle drive system.

For a hybrid vehicle provided with drive sources including an engine and an electric motor electrically powered by a battery, traveling using the electric motor is achieved by activating a vehicle drive system to cause the vehicle to be a so-called "ready-on state" when the driver turns on a start switch while pressing a brake pedal, for example. Meanwhile, traveling using the engine as a driving source is achieved by starting the engine through a system control.

In the technique disclosed in Japanese Unexamined Patent Application Publication No. 2014-202298, an automatic starting of an engine is prevented when an exit of a driver from a vehicle is detected during an idle-stop of the vehicle. Thereafter, upon a detection of departure of the driver from the vehicle, the shift range of a transmission is switched to the parking range to keep the vehicle stopping in an ignition-off state.

In the technique disclosed in Japanese Unexamined Patent Application Publication No. 2013-099029, a ripple temperature increase operation is executed to generate a vibration sound when a predetermined operation of the driver trying to exit the vehicle is detected by a detector despite the fact that the state of electric power of the vehicle is in a ready-on state in which the vehicle is allowed to travel. The vibration sound generated in accordance with the ripple temperature increase is used as an alarm to the driver trying to exit the vehicle.

SUMMARY

An aspect of the technology provides a vehicle control apparatus. The vehicle control apparatus includes a vehicle state evaluator, an exit evaluator, a shutdown evaluator, and a request output unit. The vehicle state evaluator is configured to conduct evaluations of a state of a vehicle provided with drive sources including an engine and an electric motor. The evaluation of the state of the vehicle includes a vehicle stop evaluation on the vehicle and a driving state evaluation on the engine. The vehicle state evaluator being configured to evaluate whether the vehicle is stopped in a ready-on state in the vehicle stop evaluation. The exit evaluator is configured to conduct an exit evaluation as to whether an exit of an occupant from the vehicle is detected. The shutdown evaluator is configured to conduct a shutdown evaluation as to whether a vehicle drive system is to be shut down. The shutdown evaluation is conducted on the basis of the results of the vehicle stop evaluation and the driving state evaluation by the vehicle state evaluator and the result of the exit evaluation by the exit evaluator. The request output unit is configured to output a shutdown request on the basis of the result of the shutdown evaluation by the shutdown evaluator. The shutdown request requests for shutting down the vehicle drive system.

An aspect of the technology provides a vehicle control apparatus. The vehicle control apparatus includes circuitry configured to: conduct evaluations of a state of a vehicle provided with drive sources including an engine and an electric motor. The evaluations includes a vehicle stop evaluation as to whether the vehicle is stopped in a ready-on state and a driving state evaluation on the engine; conduct an exit evaluation as to whether an exit of an occupant from the vehicle is detected; conduct a shutdown evaluation as to whether a vehicle drive system is to be shut down, the shutdown evaluation being conducted on the basis of results of the vehicle stop evaluation, the driving state evaluation, and the exit evaluation; and output a shutdown request on the basis of a result of the shutdown evaluation, the shutdown request requesting for shutting down the vehicle drive system.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

A hybrid vehicle which is stopped with an engine not being started can generate little sound and vibration. This sometimes makes the driver forget to turn off or shut down a vehicle drive system before exiting the vehicle.

If the driver fails to turn off the vehicle drive system before exiting the vehicle, the vehicle kept in a ready-on state can consume battery. A decrease in electric charge can cause the engine to start, which can consume fuel.

An automatic shutdown of the vehicle drive system may be considered as a possible countermeasure to address such concerns caused when the driver forgets to turn off the vehicle drive system. The automatic shutdown of the vehicle drive system, however, inevitably stops operations of various components of the vehicle. The automatic shutdown of the vehicle drive system thus has to be properly executed in consideration of safety and usability.

It is desirable to properly execute a shutdown control without impairing safety and usability.

[Configuration of Vehicle Drive System]

A vehicle drive system 1 of a hybrid vehicle according to an embodiment of the technology will now be described. In one embodiment, a power controller 2 among the components in the vehicle drive system 1 may serve as a "vehicle control apparatus".

Figure 1:
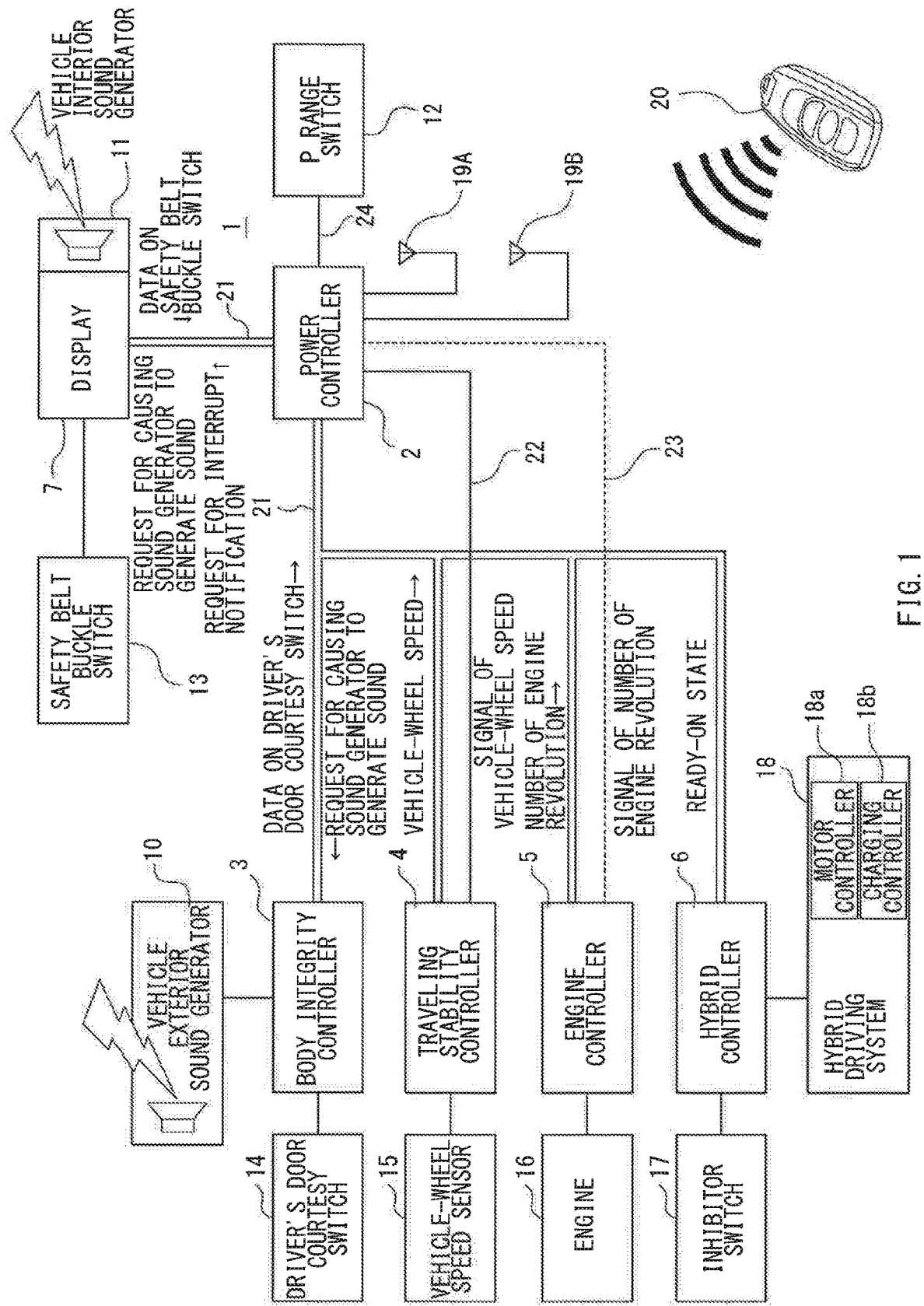
FIG. 1 is a block diagram illustrating an example configuration of a vehicle drive system according to one embodiment of the technology.

FIG. 1 is a block diagram illustrating an example configuration of the vehicle drive system 1 according to the embodiment. Note that only components relevant to the following description of the vehicle drive system 1 according to the embodiment of the technology are illustrated in FIG. 1.

The vehicle drive system 1 may be included in a hybrid vehicle provided with drive sources including an engine and an electric motor (e.g., a motor generator) for driving vehicle wheels. The vehicle drive system 1 may include the power controller 2, a body integrity controller 3, a traveling stability controller 4, an engine controller 5, a hybrid controller 6, and a display 7. These controllers may each include a microcomputer including a central processing unit (CPU), a read only memory (ROM), and a random access memory (RAM). These controllers may be coupled via a bus 21 to communicate with each other. In this embodiment, the communication among these controllers via the bus 21 may be established in accordance with a communication standard, such as controller area network (CAN).

In FIG. 1, the communication path of the bus 21 is illustrated by a double line. For example, the power controller 2 may be coupled to the traveling stability controller 4 via a wiring line 22, which is illustrated by a single line, as well as the bus 21. The wiring line 22 may be independent from the bus 21 and construct a signal transmission route that directly couples the power controller 2 to the traveling stability controller 4.

These controllers may control operations of the components in the vehicle drive system 1 and detect signals from various sensors as appropriate. Note that some components in the vehicle drive system 1 that are relevant to the operations described herein are selectively illustrated in FIG. 1.

For example, a vehicle exterior sound generator 10 outside the vehicle, a vehicle interior sound generator 11 inside the vehicle, a parking range switch (hereinafter simply referred to as a P range switch) 12, a safety belt buckle switch 13, a driver's door courtesy switch 14, a vehicle-wheel speed sensor 15, an engine 16, an inhibitor switch 17, a hybrid drive system 18, an antenna 19, and a mobile device 20 are illustrated in FIG. 1.

The vehicle drive system 1 may serve as a so-called "smart-entry system". An occupant may lock and unlock the vehicle using the mobile device 20 in a region in which the mobile device 20 and the vehicle are communicable with each other.

In this embodiment, the power controller 2 may control a power of the vehicle drive system 1 on the basis of electric waves transmitted from the mobile device 20 and received at a vehicle interior antenna 19A inside the vehicle and a vehicle exterior antenna 19B outside the vehicle. When a start button is switched on, for example, the power controller 2 may detect whether the mobile device 20 is inside the vehicle compartment. When the mobile device 20 is detected in the vehicle compartment, the power controller 2 may turn on the vehicle drive system 1 (i.e., cause the vehicle to be the ready-on state).

The power controller 2 may also be coupled to the display 7 via the bus 21. The power controller 2 may send an instruction to the display 7 to cause a predetermined operation of the display 7. For example, the power controller 2 may instruct the vehicle interior sound generator 11 provided at the display 7 to generate a sound. The power controller 2 may also request a display section (e.g., a multi-information display section) of the display 7 to show a predetermined interrupt notification relevant to the shutdown control.

The power controller 2 may acquire data on the on/off state of the safety belt buckle switch 13 via the display 7. The data may indicate whether the safety belt is fastened around the driver or released from the driver.

The power controller 2 may also be coupled to the P range switch 12 via an independent wiring line 24 to receive data from the P range switch 12. The power controller 2 may detect whether a shift position is switched to a P range.

Although the power controller 2 may perform shutdown control in this embodiment described below, it should be noted that this embodiment is mere example. A controller other than the power controller 2 may perform the shutdown control described below.

The body integrity controller 3 may control various devices including a door lock mechanism, a movable mirror, and a window opening/closing mechanism, that are installed on the vehicle body.

In this embodiment, the body integrity controller 3 may detect an operation of the driver's door courtesy switch 14 and transmit data on the detection to the power controller 2. This may enable the power controller 2 to detect opening/closing of the driver's door.

The body integrity controller 3 may control operation of the vehicle exterior sound generator 10. For example, the body integrity controller 3 may cause the vehicle exterior sound generator 10 to generate a sound in response to a request from the power controller 2.

The traveling stability controller 4 may perform a control of traveling stability of the vehicle, such as vehicle dynamics control (VDC).

In this embodiment, the traveling stability controller 4 may receive a detection signal from the vehicle-wheel speed sensor 15 and transmit data on the vehicle-wheel speed to the power controller 2 via the bus 21. The traveling stability controller 4 may also transmit the data on the vehicle-wheel speed to the power controller 2 via the wiring line 22.

Alternatively, the wiring line 22 may directly couple the vehicle-wheel speed sensor 15 to the power controller 2.

The engine controller 5 may perform various operation controls of the engine 16 including a fuel injection control, an ignition control, and an intake air volume adjusting control. The engine controller 5 may be coupled to various sensors relevant to engine controlling including a vehicle speed sensor, an engine speed sensor, an accelerator position sensor, and a throttle position sensor. The vehicle speed sensor may be disposed in the engine 16 to detect a traveling speed or a vehicle speed of the vehicle. The engine speed sensor may detect the number of revolutions of the engine 16. The accelerator position sensor may detect a degree of pressing or an accelerator position of the accelerator pedal. The throttle position sensor may detect a position of the throttle valve or a throttle valve position. The engine controller 5 may control an operation of the engine 16 using detection values received from these sensors.

Additionally, the engine controller 5 may control the engine 16 by controlling a fuel injection amount, an ignition timing, and various devices, such as an electronically controlled throttle valve, on the basis of control data from the hybrid controller 6.

The hybrid controller 6 may send predetermined instructions to the engine controller 5, a motor controller 18a and a charging controller 18b in the hybrid drive system 18, and other components on the basis of an input operation by the driver or the data on the accelerator position and other parameters of the vehicle received from the engine controller 5. The hybrid controller 6 may thereby control the operation of the vehicle.

On the basis of the instruction from the hybrid controller 6, the motor controller 18a may control driving of a traveling motor generator in the vehicle.

On the basis of the instruction from the hybrid controller 6, the charging controller 18b may control charging of a traveling battery which serves as a power of the motor generator in the vehicle. The charging controller 18b may cause the traveling battery to be charged with electric power generated by regenerative braking of the motor generator.

Additionally, on the basis of the accelerator position received from the engine controller 5, the hybrid controller 6 may calculate a required torque T (i.e., a torque to be output to the vehicle wheels) in accordance with the amount of the accelerator operation by the driver. Thereafter, the hybrid controller 6 may cause the engine controller 5 and the motor controller 18a to execute an operation control of the vehicle that makes the vehicle travel with a required driving force corresponding to the required torque T. The hybrid controller 6 may also cause the charging controller 18b to control the charging of the traveling battery on the basis of the state of charge (SOC) of the traveling battery.

There may be two traveling modes for the hybrid vehicle: an electric vehicle (EV) traveling mode and a hybrid traveling mode. The hybrid controller 6 may switch the hybrid vehicle between the two traveling modes on the basis of the state of the vehicle.

In the EV traveling mode, the hybrid controller 6 may calculate a torque required for the motor generator on the basis of the required torque T determined on the basis of the accelerator position. Thereafter, the hybrid controller 6 may send the calculated torque to the motor controller 18a to control an operation of the motor generator.

In the hybrid traveling mode, the hybrid controller 6 may calculate respective torques required for the engine and the motor generator on the basis of the required torque T. Thereafter, the hybrid controller 6 may send the respective calculated torques to the engine controller 5 and the motor controller 18a to control operations of the engine and the motor generator.

The hybrid controller 6 may detect the state of the inhibitor switch 17 to control starting of the engine. Thereafter, the hybrid controller 6 may transmit data as to whether the shift range is switched to the P range to the power controller 2 via the bus 21.

Additionally, the hybrid controller 6 may send data on a ready-on/off state of the vehicle to the power controller 2 via the bus 21.

[Shutdown Operation of First Embodiment]

In the embodiment, the vehicle drive system 1 may be automatically shut down in an assumed situation where the occupant forgets to turn off the vehicle drive system 1 before exiting the vehicle and the vehicle is kept in the ready-on state, for example. The power controller 2 may conduct evaluations and control for the automatic shutdown.

First, evaluations of requirements for the execution of the automatic shutdown control will now be described with reference to FIG. 2.

Figure 2:
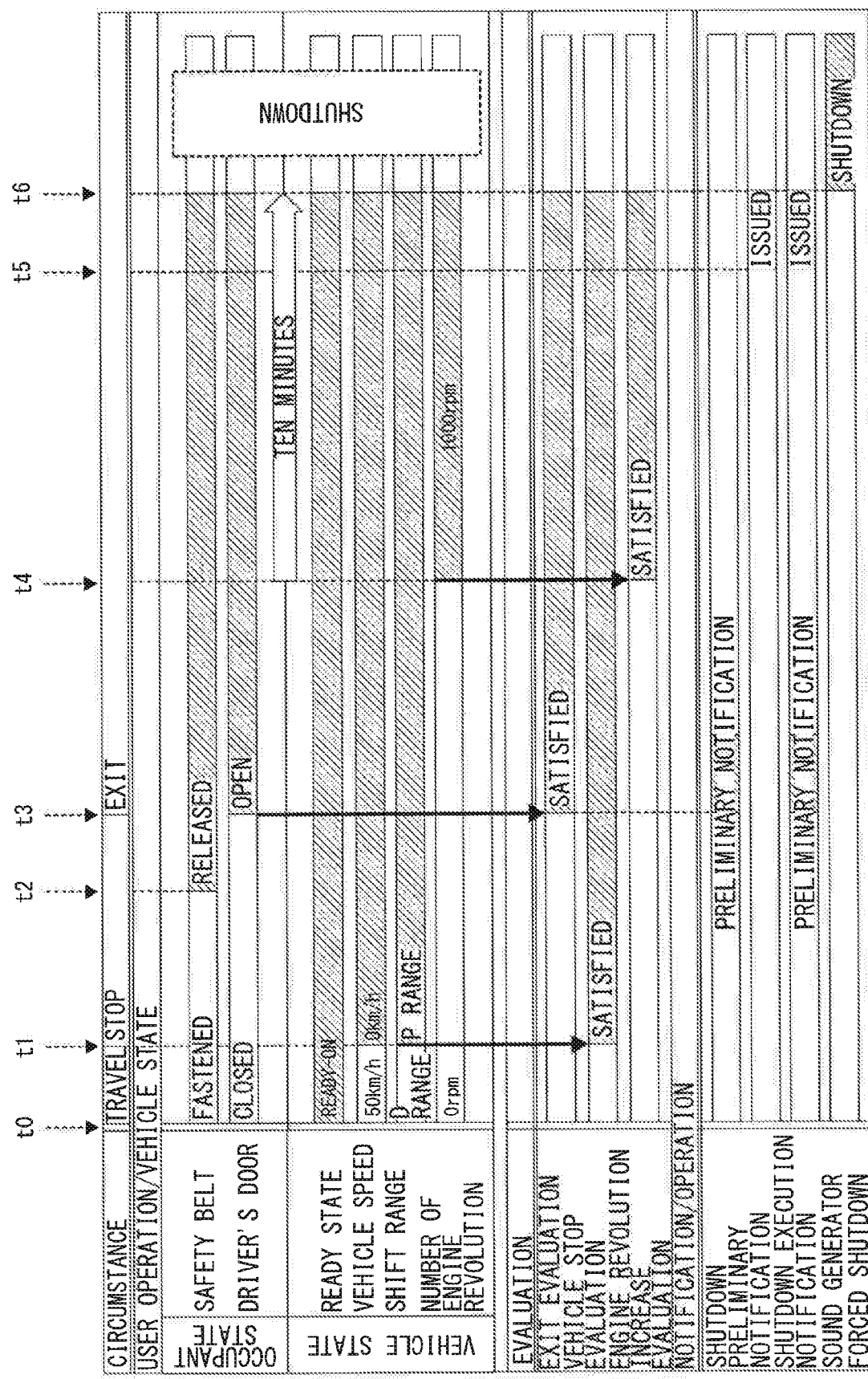
FIG. 2 is a timing chart of a shutdown control with detection elements to be detected for the shutdown control according to one embodiment of the technology.

FIG. 2 illustrates a state of the occupant (e.g., the driver in this embodiment) and a state of the vehicle in each circumstance. A horizontal axis of FIG. 2 represents time.

Examples of the circumstances may include a "travel" circumstance in which the vehicle is traveling, a "stop" circumstance in which the vehicle is stopped, and an "exit" circumstance in which an exit of the driver from the vehicle is detected, as illustrated in FIG. 2.

The state of the occupant or driver may be evaluated in terms of detection elements as to whether the safety belt is fastened around the occupant or driver or released from the occupant or driver, and whether the driver's door is open or closed, as illustrated in FIG. 2, for example.

The state of the vehicle may be evaluated in terms of detection elements, such as the ready-state (whether the vehicle is in the ready-on state or the ready-off state), a vehicle speed, a shift range, and the number of revolutions of the engine, as illustrated in FIG. 2, for example.

On the basis of the state of the occupant and the state of the vehicle, a vehicle stop evaluation, an exit evaluation, and an engine-revolution-increase evaluation may be conducted.

In the vehicle stop evaluation, a first requirement may be evaluated. The first requirement may be satisfied when the vehicle is stopped in the ready-on state.

In the exit evaluation, a second requirement may be evaluated. The second requirement may be satisfied when an exit of the occupant from the vehicle is detected.

In the engine-revolution-increase evaluation, a third requirement may be evaluated. The third requirement may be satisfied when an increase in the number of revolutions of the engine is detected. In one embodiment, the engine-revolution-increase evaluation may serve as a "driving state evaluation" of the engine.

On the basis of these evaluations, a notification of the shutdown using a display or a sound generator sound and a control of the shutdown execution may be performed.

In the following, these evaluations are described in chronological order.

The state of the occupant at a time t0 may be as follows: The vehicle is traveling, the safety belt is fastened around the occupant, and the driver's door is closed. The state of the vehicle at a time t0 may be as follows: The ready-on state is detected, the detected vehicle speed is 50 km/h, for example, and the shift range is switched to a drive range (hereinafter referred to as a D range). Additionally, the number of revolutions of the engine is 0 rpm, which means that the vehicle is traveling using the motor.

In this case, the first, second, and third requirements may not be satisfied in the vehicle stop evaluation, the exit evaluation, and the engine-revolution-increase evaluation.

At a time t1, the vehicle may be stopped. Accordingly, the vehicle speed may be 0 km/h, and the shift range may be switched to the P range. The vehicle may be kept in the ready-on state.

In this case, the first requirement may be satisfied in the vehicle stop evaluation at the time t1.

At a time t2, the safety belt may be released from the driver.

Thereafter, at a time t3, the driver's door may be opened. Accordingly, the second requirement may be satisfied in the exit evaluation at the time t3.

In general, the door is closed after the exit of the driver from the vehicle. Therefore, even if the door is closed after the opening of the door at the time t3, the second requirement in the exit evaluation may be kept satisfied.

After the satisfaction of the first and second requirements in the vehicle stop evaluation and the exit evaluation at the time t3, a control of a shutdown preliminary notification may be performed. For example, the display 7 may be caused to display a preliminary notification that a shutdown is going to be executed at this rate.

The vehicle interior sound generator 11 and the vehicle exterior sound generator 10 may be caused to output a buzzer sound preliminarily notifying the driver or occupant of the shutdown execution. Alternatively, a voice message may be output saying "A shutdown is going to be executed at this rate."

This may notify the driver or other occupants of a possibility of executing the automatic shutdown control.

In a case where the ready-on state is kept after the exit of the driver from the vehicle, the engine may start, depending on the battery level, for charging the battery. The starting of the engine may be detected at a time t4, for example. The number of revolutions of the engine detected at the time t4 may be 1000 rpm, for example.

Accordingly, the third requirement may be satisfied in the engine-revolution-increase evaluation.

At the time t4, the shutdown control may not be executed yet, and a predetermined duration time may be counted from the time t4. For example, ten minutes may be counted from the time t4 in this embodiment. The duration time to be counted should not be limited to ten minutes, and may be longer or shorter than ten minutes.

In some cases, the engine revolution may be stopped in the duration time. However, once the third requirement is satisfied in the engine-revolution-increase evaluation while the first and second requirements are respectively satisfied in the vehicle stop evaluation and the exit evaluation, the third requirement in the engine-revolution-increase evaluation may be kept satisfied even if the engine would be stopped and the number of revolutions of the engine would be decreased. This may take into consideration of a possibility of a change in the number of revolutions of the engine depending on the state of charge of the battery.

A duration time of ten minutes may be completed at a time t6, for example. In this case, the shutdown control may be executed at the time t6. For example, the power controller 2 may send a shutdown request to each of the controllers to turn off the vehicle drive system 1.

At a time t5 before the time t6, a notification that the shutdown is going to be executed (hereinafter referred to as a shutdown execution notification) may be issued. For example, the display 7 may be caused to display a notification that the shutdown is going to be executed in a short time. Additionally, the vehicle interior sound generator 11 and the vehicle exterior sound generator 10 may be caused to output a buzzer sound notifying the driver or occupant of the shutdown execution. Alternatively, a voice message may be output saying "A shutdown is going to be executed in a short time."

This may help preventing the vehicle drive system 1 from being automatically shut down without any preliminary notification to a driver or occupant inside or around the vehicle, if any, at the time t5.

As described above, the automatic shutdown control may be executed when the first, second, and third requirements are respectively satisfied in the vehicle stop evaluation, the exit evaluation, the engine-revolution-increase evaluation, and a condition where these requirements are satisfied has held for the predetermined duration time.

[Configuration for Shutdown Control]

Figure 3:
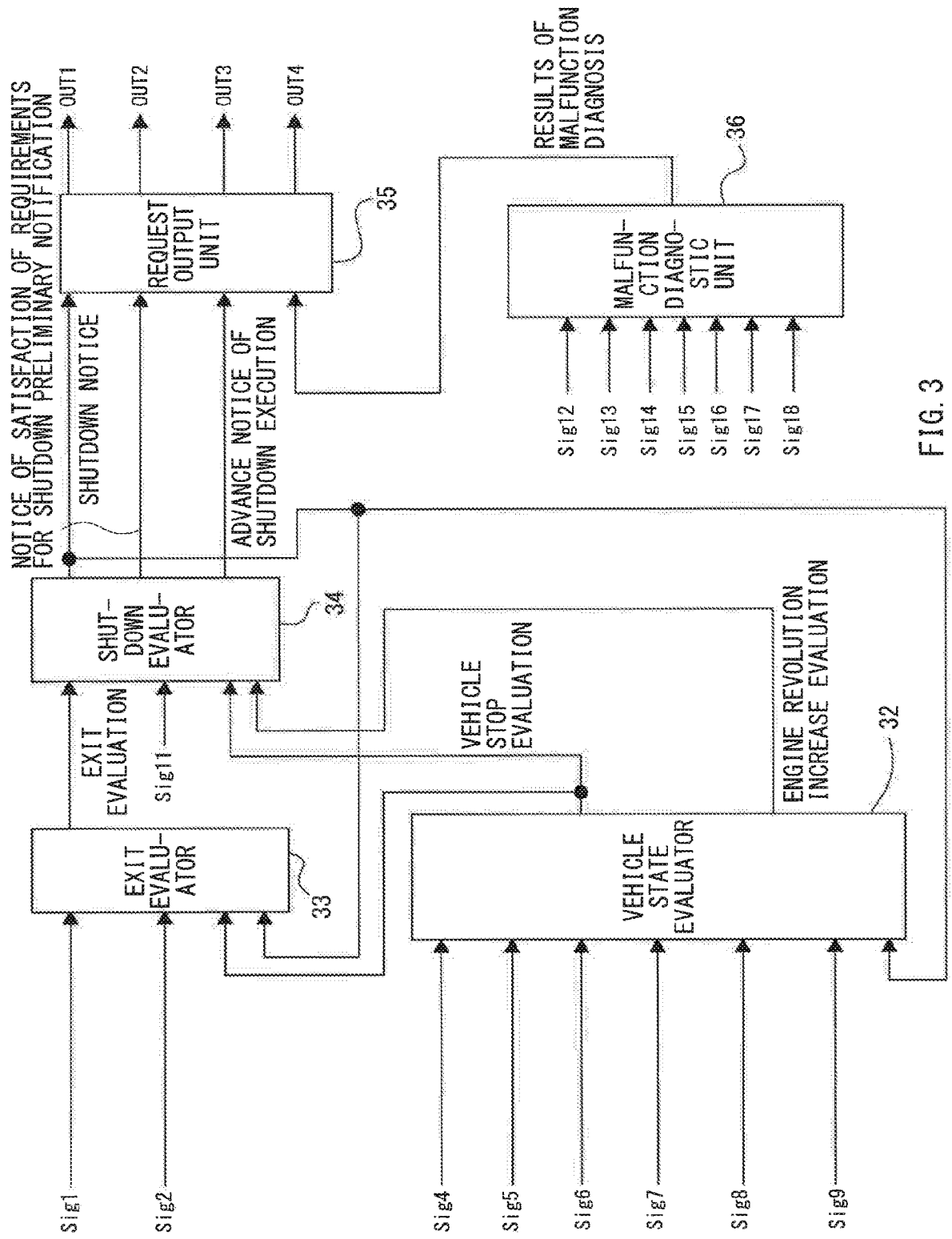
FIG. 3 is a block diagram of a configuration of a power controller for a shutdown control according to one embodiment of the technology.

With reference to FIG. 3, an example configuration of the power controller 2 that executes the shutdown control illustrated in FIG. 2 will now be described.

As illustrated in FIG. 3, the power controller 2 may include a vehicle state evaluator 32, an exit evaluator 33, a shutdown evaluator 34, a request output unit 35, and a malfunction diagnostic unit 36 that may be implemented as software or hardware, for example.

The vehicle state evaluator 32 may receive signals Sig4, Sig5, Sig6, Sig7, Sig8, and Sig9 to perform the vehicle stop evaluation and the engine-revolution-increase evaluation.

The signal Sig4 may be indicative of the data transmitted from the hybrid controller 6 via the bus 21 to the power controller 2 or the data indicating whether the shift position is switched to the P range.

The signal Sig5 may be indicative of the data transmitted from the traveling stability controller 4 via the bus 21 to the power controller 2 or the data indicating the vehicle speed or vehicle-wheel speed.

The signal Sig6 may be indicative of the data transmitted from the hybrid controller 6 via the bus 21 to the power controller 2 or the data indicating the ready-on/off state of the vehicle.

The signal Sig7 may be indicative of the data transmitted from the engine controller 5 via the bus 21 to the power controller 2 or the data indicating the number of revolutions of the engine.

The signal Sig8 may be indicative of the data transmitted from the P range switch 12 to the power controller 2 or the data indicating whether the shift range is switched to the P range.

The signal Sig9 may be indicative of the data transmitted from the traveling stability controller 4 via the wiring line 22 to the power controller 2 or the data indicating the vehicle-wheel speed.

The vehicle state evaluator 32 may conduct the vehicle stop evaluation on the basis of the signals Sig4, Sig5, Sig6, Sig8, and Sig9. In other words, the vehicle state evaluator 32 may determine whether the vehicle is stopped in the ready-on state.

Example detection elements to be detected in the vehicle stop evaluation may include the shift range and the vehicle speed.

The vehicle state evaluator 32 may verify that the shift range is switched to the P range on the basis of the signals Sig4 and Sig8.

The vehicle state evaluator 32 may verify that the vehicle speed is zero on the basis of the signals Sig5 and Sig9.

In other words, the vehicle state evaluator 32 may verify the stop of the vehicle when all of the signals Sig4, Sig5, Sig8, and Sig9 indicate the stop of the vehicle, and detect the ready-on state of the vehicle on the basis of the signal Sig6.

The vehicle state evaluator 32 may transmit the result of the vehicle stop evaluation to the exit evaluator 33 and the shutdown evaluator 34.

Additionally, the vehicle state evaluator 32 may conduct the engine-revolution-increase evaluation on the basis of the signal Sig7.

For example, the vehicle state evaluator 32 may monitor the signal Sig7 in a condition where the first requirement is satisfied in the vehicle stop evaluation. When an increase in the number of revolutions of the engine is detected during the monitoring of the signal Sig7, the vehicle state evaluator 32 may determine that the third requirement is satisfied in the engine-revolution-increase evaluation. The vehicle state evaluator 32 may transmit the result of the engine-revolution-increase evaluation to the shutdown evaluator 34.

As illustrated by a broken line in FIG. 1, the power controller 2 may be coupled to the engine controller 5 via an independent wiring line 23 as well as the bus 21. The signal indicative of the number of revolutions of the engine may be transmitted from the engine controller 5 to the power controller 2.

In this embodiment, the signal indicative of the number of revolutions of the engine may be transmitted via the independent wiring line 23 to the vehicle state evaluator 32, for example. This may allow the power controller 2 to conduct the engine-revolution-increase evaluation on the basis of the CAN signal transmitted via the bus 21 and the signal transmitted via the independent wiring line 23, which improves accuracy in the evaluation.

Alternatively, the wiring line 23 may directly couple the engine speed sensor to the power controller 2.

The exit evaluator 33 may receive the signals Sig1 and Sig2 and the result of the vehicle stop evaluation from the vehicle state evaluator 32 to conduct the exit evaluation.

The signal Sig1 may be indicative of the on/off state of the safety belt buckle switch 13. The signal Sig1 may be transmitted via the display 7 and the bus 21 to the power controller 2.

The signal Sig2 may be indicative of the on/off state of the driver's door courtesy switch 14. The signal Sig2 may be transmitted from the body integrity controller 3 via the bus 21 to the power controller 2.

The exit evaluator 33 may first verify whether the vehicle is stopped on the basis of the result of the vehicle stop evaluation transmitted from the vehicle state evaluator 32. The exit evaluator 33 may conduct the exit evaluation on the precondition that the vehicle is stopped.

When detecting that a release of the safety belt on the basis of the signal Sig1 and opening of the driver's door on the basis of the signal Sig2, the exit evaluator 33 may determine that the exit of the driver from the vehicle is detected and that the second requirement is thus satisfied in the exit evaluation.

The exit evaluator 33 may transmit the result of the exit evaluation to the shutdown evaluator 34.

The shutdown evaluator 34 may receive a signal Sig11, the results of the vehicle stop evaluation and the engine-revolution-increase evaluation from the vehicle state evaluator 32, and the result of the exit evaluation from the exit evaluator 33 to conduct a shutdown evaluation as to whether the shutdown is to be executed.

The signal Sig11 may be indicative of the on/off state of an ignition. The signal Sig11 may be transmitted from the hybrid controller 6 or the engine controller 5, for example.

The shutdown evaluator 34 may verify whether one of requirements (the first requirement) for a shutdown is satisfied on the basis of the result of the vehicle stop evaluation transmitted from the vehicle state evaluator 32.

The shutdown evaluator 34 may also verify whether one of the requirements (the second requirement) for a shutdown is satisfied on the basis of the result of the exit evaluation transmitted from the exit evaluator 33.

The shutdown evaluator 34 may also verify whether one of the requirements (the third requirement) for a shutdown is satisfied on the basis of the result of the engine-revolution-increase evaluation transmitted from the vehicle state evaluator 32.

When verifying the satisfaction of the first, second, and third requirements, the shutdown evaluator 34 may cause a duration time counter in the shutdown evaluator 34 to count a predetermined time. For example, the duration time counter may count ten minutes from the time t4 illustrated in FIG. 2.

On the basis of the results of these evaluations, the shutdown evaluator 34 may provide the request output unit 35 with a shutdown notice, a notice of satisfaction of the requirements for a shutdown preliminary notification, and an advance notice of shutdown execution.

The shutdown evaluator 34 may provide the request output unit 35 with the notice of satisfaction of the requirements for a shutdown preliminary notification at a timing (e.g., the time t3 illustrated in FIG. 2) when verifying the satisfaction of the first and second requirements. The request output unit 35 may be thereby caused to issue the shutdown preliminary notification.

The shutdown evaluator 34 may provide the request output unit 35 with the advance notice of shutdown execution at a timing (e.g., the time t5 illustrated in FIG. 2) before the execution of the shutdown, i.e., when the duration time counter has counted a predetermined time since the satisfaction of the first, second, and third requirements. The request output unit 35 may be thereby caused to issue the shutdown execution notification.

The shutdown evaluator 34 may provide the request output unit 35 with the shutdown notice at the timing (e.g., at the time t6 illustrated in FIG. 2) of the execution of the shutdown. The request output unit 35 may be thereby caused to output a request for executing the shutdown.

The shutdown notice may also be transmitted to the vehicle state evaluator 32 and the exit evaluator 33. In response to the shutdown notice, the vehicle state evaluator 32 and the exit evaluator 33 may perform termination processing in accordance with the shutdown execution. The vehicle state evaluator 32 and the exit evaluator 33 may initialize the flags used for the evaluations in the termination processing.

The shutdown evaluator 34 may use the signal Sig11 indicative of the on/off state of the ignition to reset the duration time counter. For example, the shutdown evaluator 34 may reset the duration time counter at the timing when the ignition is switched from OFF to ON, which makes it possible to count a duration time from the start of the engine 16.

Additionally, the shutdown evaluator 34 may use the signal Sig11 indicative of the on/off state of the ignition in any of the evaluations of the requirements described above in a supplementary way. For example, the signal Sig11 may be used to verify the reliability of the satisfaction of the third requirement in the engine-revolution-increase evaluation.

The request output unit 35 may output control signals OUT1, OUT2, OUT3, and OUT4 in response to the notices from the shutdown evaluator 34.

The control signal OUT1 may request for a shutdown. In response to the shutdown notice from the shutdown evaluator 34, the request output unit 35 may output the control signal OUT1 to execute the shutdown of the vehicle drive system 1. For example, a power relay may be driven by the control signal OUT1 requesting for the shutdown to execute the shutdown of the vehicle drive system 1.

The control signal OUT2 may request for a shutdown preliminary notification. In response to the notice of satisfaction of the requirements for a shutdown preliminary notification from the shutdown evaluator 34, the request output unit 35 may output the control signal OUT2 to issue the shutdown preliminary notification. For example, the request output unit 35 may instruct the display 7 to display a shutdown preliminary notification and the vehicle interior sound generator 11 to generate a sound preliminarily notifying the shutdown. Additionally, the request output unit 35 may instruct the body integrity controller 3 to generate a sound preliminarily notifying the shutdown from the vehicle exterior sound generator 10.

The control signal OUT3 may request for the shutdown execution notification. In response to the advance notice of shutdown execution from the shutdown evaluator 34, the request output unit 35 may output the control signal OUT3 to issue the shutdown execution notification. For example, the request output unit 35 may instruct the display 7 to display a shutdown execution notification and the vehicle interior sound generator 11 to generate a sound notifying the shutdown execution. Additionally, the request output unit 35 may instruct the body integrity controller 3 to generate a sound notifying the shutdown execution from the vehicle exterior sound generator 10.

In addition to the control signals described above, the request output unit 35 may switch outputs on the basis of the malfunction diagnosis signal received from the malfunction diagnostic unit 36. This allows the request output unit 35 to perform a fail-safe operation.

The malfunction diagnostic unit 36 may receive signals Sig12, Sig13, Sig14, Sig15, Sig16, Sig17, and Sig18 to conduct a malfunction diagnosis. These signals may each indicate the result of an abnormality diagnosis of data from the corresponding controller.

The signal Sig12 may indicate the result of an abnormality diagnosis of the power controller 2.

The signal Sig13 may indicate the result of a normality/abnormality diagnosis of the data transmitted from the body integrity controller 3 via the CAN communication. The signal Sig13 may be used to evaluate the reliability of the data transmitted from the driver's door courtesy switch 14 via the bus 21 or the data on the on/off state of the driver's door courtesy switch 14.

The signal Sig14 may indicate the result of a normality/abnormality diagnosis of the data transmitted from the traveling stability controller 4 via the CAN communication. The signal Sig14 may be used to evaluate the reliability of the data transmitted from the vehicle-wheel speed sensor 15 via the bus 21.

The signal Sig15 may indicate the result of the normality/abnormality diagnosis of the data transmitted from the engine controller 5 via the CAN communication. The signal Sig15 may be used to evaluate the reliability of the data on the number of revolutions of the engine 16 transmitted via the bus 21.

The signal Sig16 may indicate the result of a normality/abnormality diagnosis of the data transmitted from the hybrid controller 6 via the CAN communication. The signal Sig16 may be used to evaluate the reliability of the data on the ready-on/off state transmitted from the hybrid controller 6 via the bus 21.

The signal Sig17 may indicate the result of a normality/abnormality diagnosis of the data transmitted from the P range switch 12 via the wiring line 24. The signal Sig17 may be used to evaluate the reliability of the data on the P range switch 12.

The signal Sig18 may indicate the result of a normality/abnormality diagnosis of the data transmitted from the traveling stability controller 4 or the vehicle-wheel speed sensor 15 via the wiring line 22. The signal Sig18 may be used to evaluate the reliability of the data on the vehicle-wheel speed sensor 15.

The malfunction diagnostic unit 36 may conduct a malfunction diagnosis to verify whether all of the controllers are working normally or any of the controllers is in malfunction on the basis of these signals. Thereafter, the malfunction diagnostic unit 36 may send the result of the malfunction diagnosis to the request output unit 35. For example, the malfunction diagnostic unit 36 may output a signal indicative of no malfunction when all the signals are verified to be normal, whereas a signal indicative of a malfunction when at least one of the signals is verified to be abnormal.

The request output unit 35 may determine the occurrence of a malfunction and the normality of the controllers on the basis of the result of the malfunction diagnosis received from the malfunction diagnostic unit 36. In other words, the request output unit 35 may verify the validity of the evaluations by the shutdown evaluator 34.

When determining the occurrence of a malfunction on the basis of the result of the malfunction diagnosis, the request output unit 35 may output neither the control signal OUT1 requesting for a shutdown execution, the control signal OUT2 requesting for a shutdown preliminary notification, nor the control signal OUT3 requesting for a shutdown execution notification.

The request output unit 35 may output the control signal OUT4 instead, which requests for a malfunction notification. For example, the request output unit 35 may instruct the display 7 to display a malfunction notification, and the vehicle interior sound generator 11 to generate a sound notifying the malfunction. Optionally, the request output unit 35 may instruct the body integrity controller 3 to generate a sound notifying the malfunction from the vehicle exterior sound generator 10.

[Example Procedures]

Example processing executed in the power controller 2 having the configuration illustrated in FIG. 3 will now be described.

Figure 4:
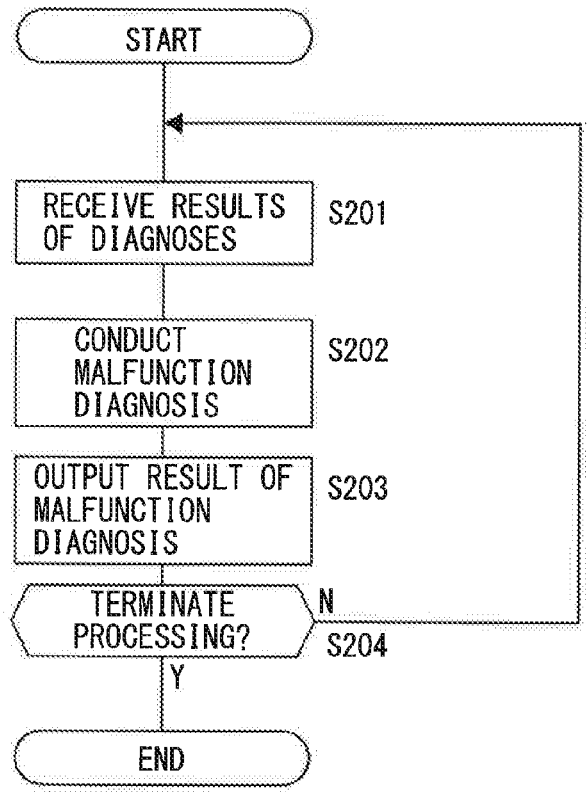
FIG. 4 is a flowchart of a procedure for a malfunction diagnosis according to one embodiment of the technology.

FIG. 4 illustrates an example procedure for the malfunction diagnosis executed by the malfunction diagnostic unit 36 in the power controller 2. While the vehicle drive system 1 is in turned on, the malfunction diagnostic unit 36 may execute the processing illustrated in FIG. 4 in a continuous manner or at a predetermined time interval.

In Step S201, the malfunction diagnostic unit 36 may receive signals indicative of results of various diagnoses. For example, the malfunction diagnostic unit 36 may receive the signals Sig12, Sig13, Sig14, Sig15, Sig16, Sig17, and Sig18.

Thereafter, in Step S202, the malfunction diagnostic unit 36 may conduct the malfunction diagnosis. For example, when one or more of the signals Sig12, Sig13, Sig14, Sig15, Sig16, Sig17, and Sig18 is detected to be abnormal, the malfunction diagnostic unit 36 may determine that a malfunction is detected. When all of the signals Sig12, Sig13, Sig14, Sig15, Sig16, Sig17, and Sig18 are detected to be normal, the malfunction diagnostic unit 36 may determine that no malfunction is detected.

Thereafter, in Step S203, the malfunction diagnostic unit 36 may output a notice of the result of the malfunction diagnosis to the request output unit 35. Thereafter, in Step S204, the malfunction diagnostic unit 36 may determine whether the processing is to be terminated. When determining that the processing is to be terminated (Step S204: Y), the malfunction diagnostic unit 36 may terminate the processing.

Otherwise (Step S204: N), the processing by the malfunction diagnostic unit 36 may return from Step S204 to Step S201 and the steps describe above may be repeated.

Figure 5:
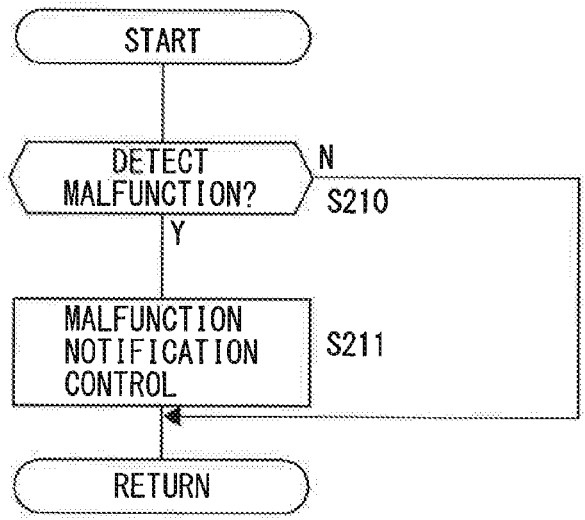
FIG. 5 is a flowchart of a procedure for a malfunction notification according to one embodiment of the technology.

FIG. 5 illustrates an example procedure for the malfunction notification executed by the request output unit 35 on the basis of the result of the malfunction diagnosis.

The request output unit 35 may sequentially verify the results of the malfunction diagnosis received from the malfunction diagnostic unit 36 in Step S210. When a malfunction is detected by the malfunction diagnostic unit 36 (Step S210: Y), the processing by the request output unit 35 may proceed from Step S210 to Step S211 in which the request output unit 35 performs control of a malfunction notification. In other words, the request output unit 35 may output the control signal OUT4 to cause a malfunction notification to be issued. In contrast, when no malfunction is detected by the malfunction diagnostic unit 36 (Step S210: N), the request output unit 35 may terminate the processing.

This enables to notify the driver or occupant of an occurrence of a malfunction promptly.

Figure 6:
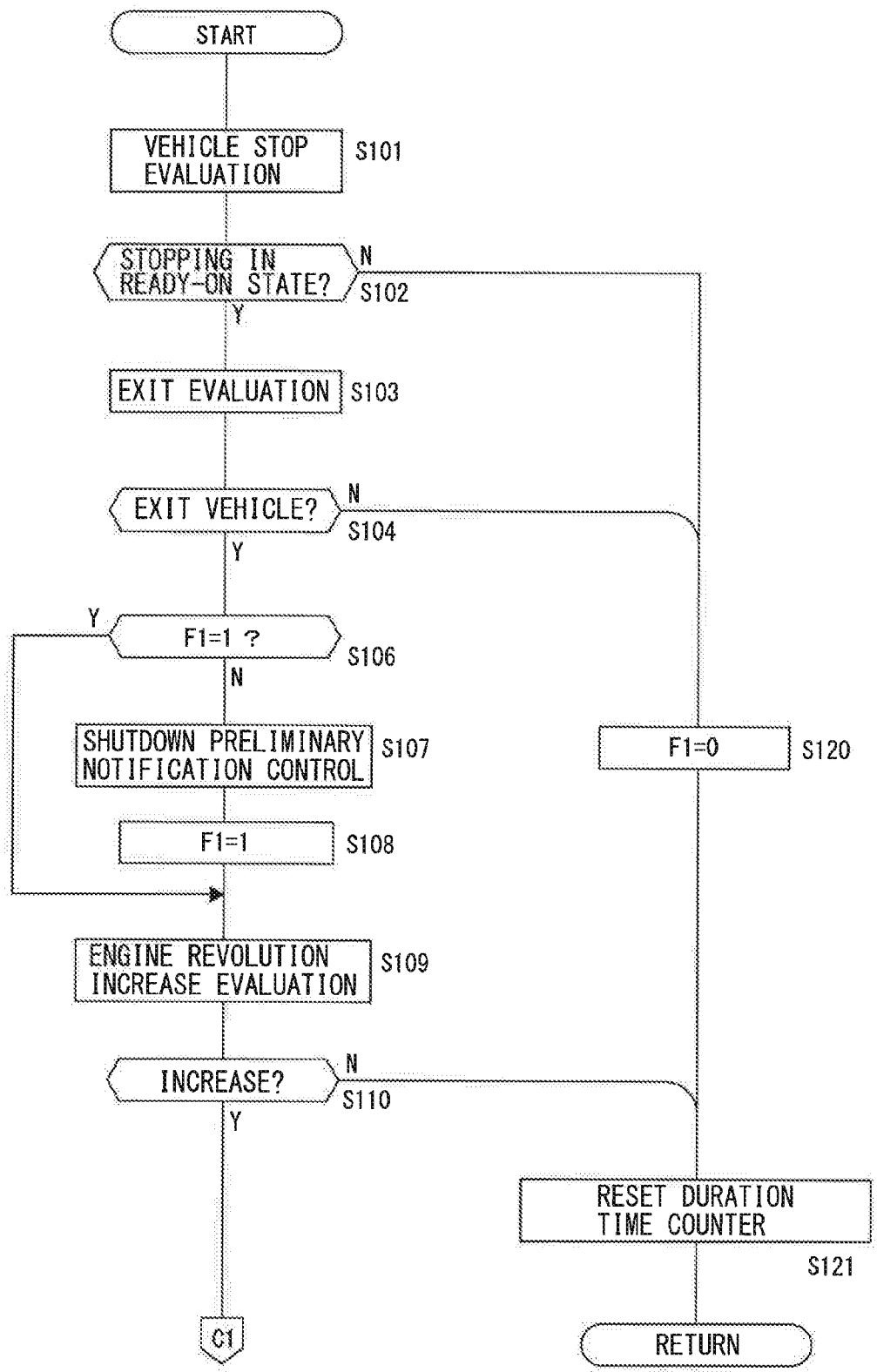
FIG. 6 is a flowchart of a procedure for a shutdown control according to one embodiment of the technology.
Figure 7:
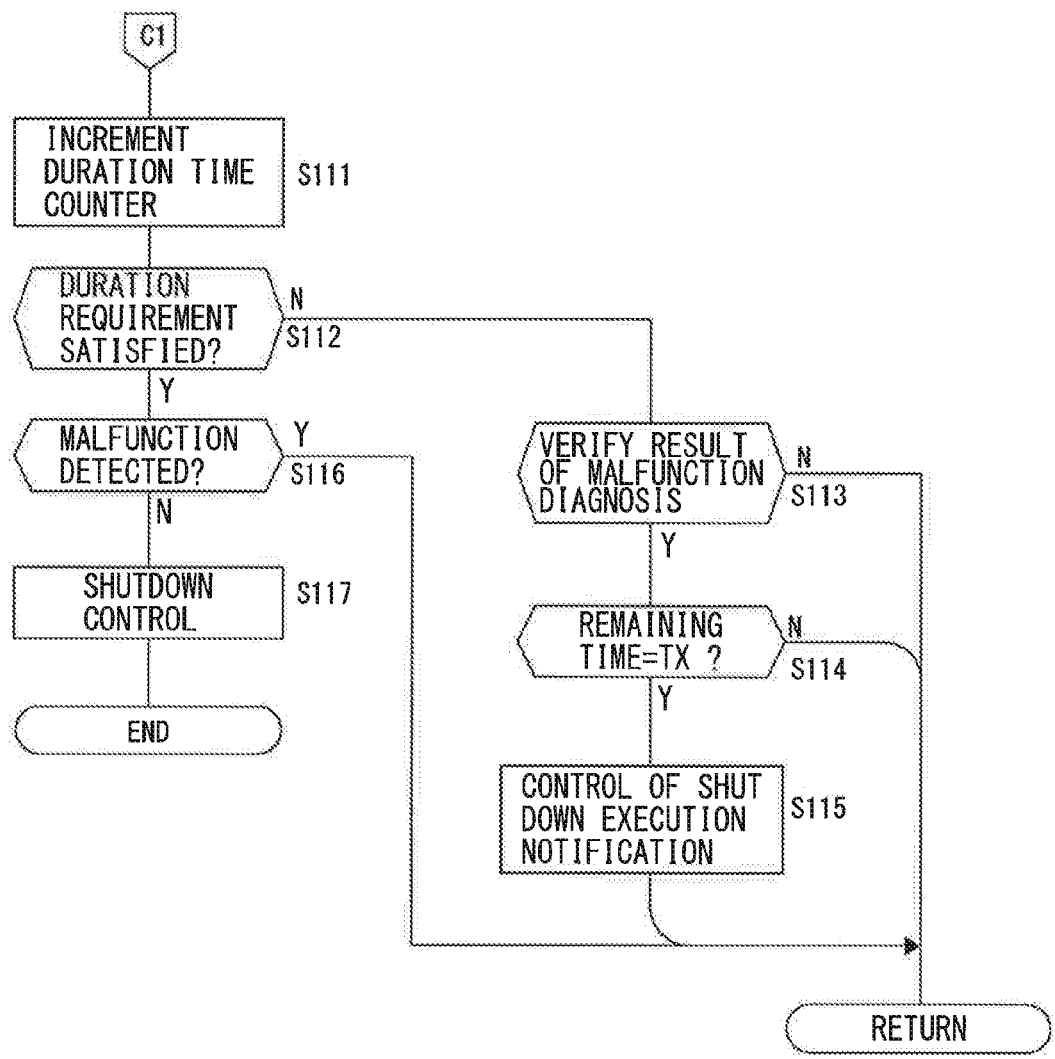
FIG. 7 is a flowchart of a procedure for a shutdown control according to one embodiment of the technology.

Next, an example procedure for the shutdown control will now be described with reference to FIGS. 6 and 7. FIGS. 6 and 7 illustrate an example procedure executed by the power controller 2 including the vehicle state evaluator 32, the exit evaluator 33, the shutdown evaluator 34, and the request output unit 35.

Note that steps subsequent to Step S110 are represented as "C1" in FIG. 6. The steps represented as "C1" correspond to steps in FIG. 7, which starts with Step S111. The procedure illustrated in FIGS. 6 and 7 may be executed in a continuous manner or at a predetermined time interval.

In Step S101 illustrated in FIG. 6, the power controller 2 may conduct the vehicle stop evaluation. For example, the vehicle state evaluator 32 may perform the vehicle stop evaluation described above.

In Step S102, the vehicle state evaluator 32 may evaluate whether the vehicle is stopped in the ready-on state.

When the vehicle state evaluator 32 does not determine that the vehicle is stopped in the ready-on state (Step S102: N), the procedure may proceed from Step S102 to Step S120 in which the power controller 2 may set a flag F1 to zero (F1=0). Thereafter, in Step S121, the power controller 2 may reset the duration time counter, and the procedure may return to Step S101.

The flag F1 may be used to issue a shutdown preliminary notification at the timing when the second requirement is satisfied.

The duration time counter in the shutdown evaluator 34 may count a duration time during which the first, second, and third requirements are satisfied. For example, the duration time counter may serve as a timer which counts ten minutes from the time t4 illustrated in FIG. 2. When the first, second, and third requirements are not satisfied, the duration time counter may be reset in Step S121.

When the vehicle state evaluator 32 determines that the vehicle is stopped in the ready-on state, i.e., when the first requirement for the shutdown is satisfied (Step S102: Y), the procedure may proceed from Step S102 to Step S103 in which the power controller 2 may conduct the exit evaluation. In other words, the exit evaluator 33 may perform the exit evaluation described above.

In contrast, when the exit of the driver from the vehicle is not detected (Step S104: N), the procedure may proceed from Step S104 to Step S120 in which the power controller 2 may set the flag F1 to zero (F1=0). Thereafter, in Step S121, the power controller 2 may reset the duration time counter, and the procedure may return to Step S101.

When the first requirement is satisfied but the second requirements is not satisfied, the exit evaluation may be repeated in Step S103 in FIG. 6. Once the second requirement is satisfied in the exit evaluation (Step S104: Y), the procedure executed by the power controller 2 may proceed from Step S104 to Step S106.

In Step S103, the second requirement may be satisfied in the exit evaluation when the safety belt is released, and the driver's door is opened. Note that, once the second requirement is satisfied when the door is opened, the second requirement may be kept satisfied even if the driver's door would be closed and opened again. This may take into consideration that the door is closed after the exit of the driver from the vehicle in general and that there often are cases where the door is opened again for any reason.

In this embodiment, once the second requirement is satisfied, the second requirement may be kept satisfied until the shutdown unless boarding of the driver would be detected on the basis of fastening of the safety belt or other detection elements, or the traveling state of the vehicle would be detected. Note that various processing other than that described in this embodiment may be conceivable.

When the procedure proceeds to Step S106 for the first time, the flag F1 is zero (F1=0) (Step S106: N). The procedure may thus proceed to Step S107 in which the power controller 2 may control a shutdown preliminary notification. For example, when verifying that the first and second requirements are satisfied, the shutdown evaluator 34 may cause the request output unit 35 to output the control signal OUT2 requesting for a shutdown preliminary notification. This may cause the display 7, the vehicle interior sound generator 11, and the vehicle exterior sound generator 10 to preliminarily notify the shutdown.

After outputting the control signal OUT2, the power controller 2 may set the flag F1 to 1 (F1=1) in Step S108 (Step S106: Y), and the procedure may proceed to Step S109 so as not repeat the shutdown preliminary notification.

Thereafter, in Step S109, the power controller 2 may conduct the engine-revolution-increase evaluation. For example, the shutdown evaluator 34 may verify the result of the engine-revolution-increase evaluation by the vehicle state evaluator 32 to determine whether the third requirement is satisfied.

When an increase in the number of revolutions of the engine is not detected (Step S110: N), the procedure may proceed from Step S110 to Step S121 in which the duration time counter is reset. Thereafter, the procedure may return to Step S101.

Thereafter, the procedure illustrated in FIG. 6 may proceed from Steps S101 to S106 as described above, because a condition where the first and second requirements are satisfied and the third requirement is not satisfied. The flag F1 is 1 (F1=1) in Step S106 in this cycle. The procedure may thus jump to Step S109 in which the engine-revolution-increase evaluation may be conducted.

When the third requirement that an increase in the number of revolutions of the engine is detected is satisfied at a certain time (Step S110: Y), the procedure executed by the power controller 2 may proceed from Step S110 to Step S111 in FIG. 7.

Note that, once an increase in the number of revolutions of the engine is detected in the engine-revolution-increase evaluation in Step S109, the third requirement may be kept satisfied even if the revolution of the engine would be stopped or decreased afterwards. This may take into consideration of a possible change in the number of revolutions of the engine.

For example, once the third requirement is satisfied, the third requirement may be kept satisfied until the shutdown unless a predetermined condition cancelling the third requirement would be detected. The predetermined condition may be boarding of the driver or the traveling state of the vehicle, for example. Note that various processing other than that described in this embodiment may be conceivable.

In Step S111, a duration time evaluation may be conducted. In other words, a predetermined time may be counted after the satisfaction of the first, second, and third requirements. For example, the shutdown evaluator 34 may increment the duration time counter in Step S111.

Thereafter, in Step S112, the power controller 2 may verify whether the predetermined time, which may be ten minutes, for example, has been counted by the duration time counter.

The power controller 2 may determine that a duration requirement (hereinafter also referred to as a fourth requirement) is satisfied when the predetermined time (e.g., ten minutes) has passed.

When ten minutes has not passed, for example (Step S112: N), the procedure executed by the power controller 2 may proceed from Step S112 to Step S113 because the duration requirement is not be satisfied. In Step S113, the request output unit 35 of the power controller 2 may verify the result of the malfunction diagnosis by the malfunction diagnostic unit 36.

When a malfunction is detected (Step S113: N), the procedure may return to Step S101 in FIG. 6. In this case, the malfunction notification may be issued through the procedure illustrated in FIG. 5, as described above.

When no malfunction is detected (Step S113: Y), the power controller 2 may verify whether an actual remaining time before satisfaction of the duration requirement is equal to a remaining time Tx in Step S114. In an example where the remaining time Tx is 20 seconds, the power controller 2 may verify whether the duration time counter has counted nine minutes and forty seconds, which corresponds to the time t5 in FIG. 2.

When an actual remaining time is longer than the remaining time Tx (Step S114: N), the procedure may return to Step S101 in FIG. 6.

When an actual remaining time becomes equal to the remaining time Tx (Step S114: Y), the procedure may proceed to S115 in which the power controller 2 may perform a control of the shutdown execution notification. For example, when verifying that an actual remaining time becomes equal to the remaining time Tx on the basis of the time count value, the shutdown evaluator 34 may output the advance notice of shutdown execution to the request output unit 35. In response to the advance notice of shutdown execution, the request output unit 35 may output the control signal OUT3 to issue a shutdown execution notification. This may cause the display 7, the vehicle interior sound generator 11, and the vehicle exterior sound generator 10 to issue the shutdown execution notification. Thereafter, the procedure may return to Step S101 in FIG. 6.

After ten minutes has passed, for example, the power controller 2 may determine that the duration requirement is satisfied in Step S112 (Step S112: Y), and the procedure by the power controller 2 may proceed to S116.

In Step S116, the request output unit 35 of the power controller 2 may verify the result of the malfunction diagnosis by the malfunction diagnostic unit 36.

When the request output unit 35 of the power controller 2 verifies that any malfunction is not detected (Step S116: N), the procedure may proceed to Step S117 in which the power controller 2 may conduct the shutdown control. For example, the request output unit 35 may output the control signal OUT1 requesting for the shutdown execution. In response to the control signal OUT1, the vehicle drive system 1 may be shut down and turned off.

In contrast, when the request output unit 35 of the power controller 2 verifies that a malfunction is detected in Step S116 (Step S116: Y), the procedure may return to Step S101. In other words, the shutdown control may not be executed when a malfunction is detected. In this case, the request output unit 35 may request for the malfunction notification through the procedure illustrated in FIG. 5.

[Shutdown Operation According to Second Embodiment]

An example shutdown operation according to a second embodiment will now be described with reference to FIG. 8. Like FIG. 2, FIG. 8 illustrates a state of the occupant, a state of the vehicle, detection elements for evaluations, and control operations.

Figure 8:
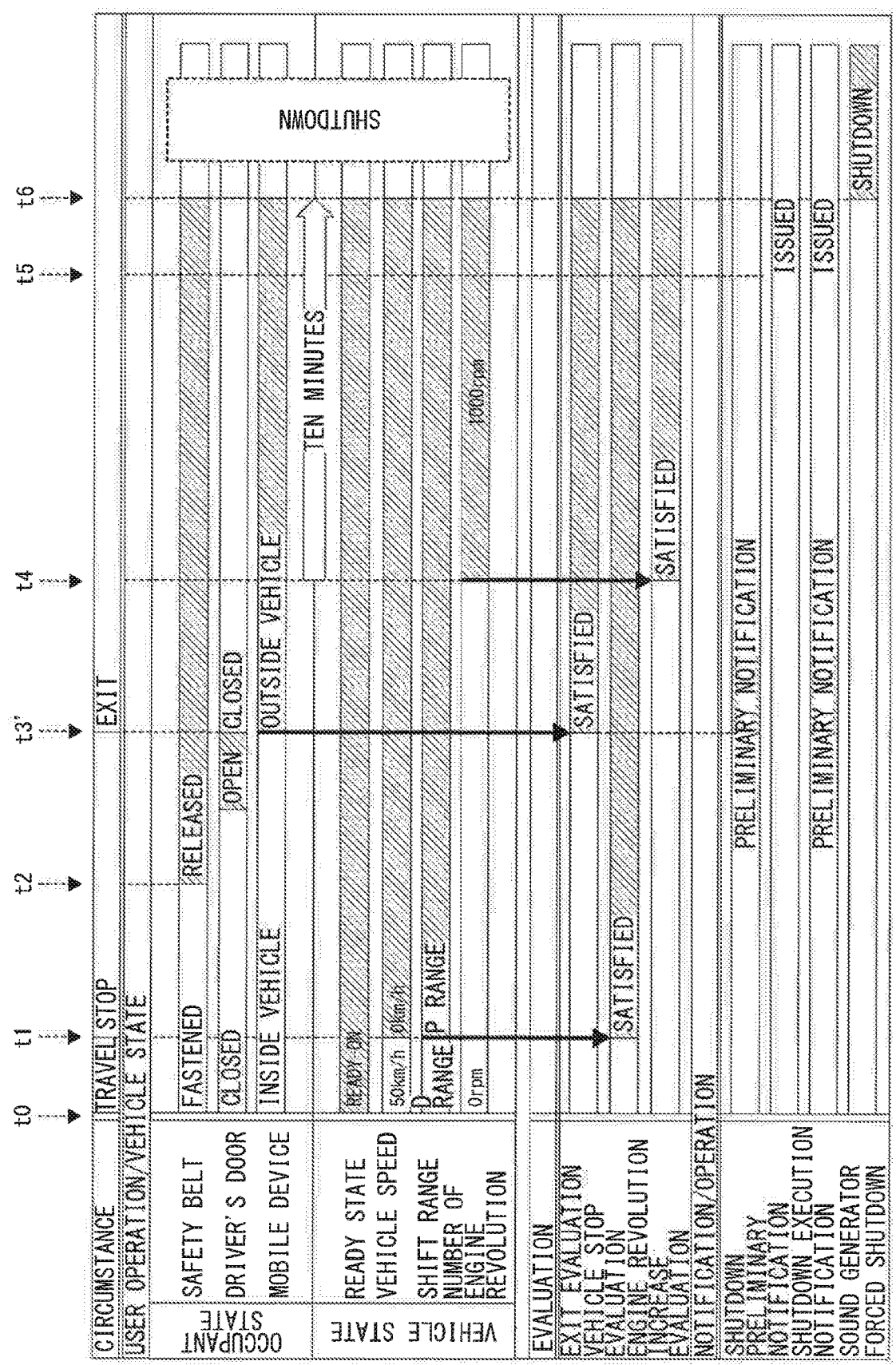
FIG. 8 is a timing chart of a shutdown control with detection elements to be detected for the shutdown control according to a modification of one embodiment of the technology.

The example of FIG. 8 may be different from the example of FIG. 2 in that the exit evaluation as to whether the exit of the occupant (e.g., the driver or passenger in this embodiment) from the vehicle is detected involves detecting an additional detection element as whether the mobile device 20 is in the vehicle compartment as well as detection elements described in FIG. 2.

The power controller 2 may be provided with the vehicle interior antenna 19A and the vehicle exterior antenna 19B that establish wireless communication with the mobile device 20. The power controller 2 may determine whether the occupant is inside or outside the vehicle on the basis of the communication status with the mobile device 20 carried by the occupant.

The detection as to whether the mobile device 20 is inside or outside the vehicle may be used as a detection element to be detected in the exit evaluation.

For example, the exit evaluator 33 may receive a signal indicative of the result of the detection of the mobile device 20. When the safety belt is released, any door of the vehicle is opened and then closed, and the mobile device 20 is detected outside the vehicle compartment after the satisfaction of the first requirement at the time t1, the power controller 2 may determine that the second requirement for the shutdown control is satisfied at a time t3', for example.

In other words, the power controller 2 may determine that the exit of the occupant carrying the mobile device 20 from the vehicle is detected on the basis of opening and then closing of any door of the vehicle and the presence of the mobile device 20 outside the vehicle.

As described above, the shutdown control may be performed on the basis of modified detection elements.

Alternatively, the exit of the occupant from the vehicle may be determined on the basis of a load on the driver's seat or passenger's seat, for example, in both of the examples illustrated in FIGS. 2 and 8. Still alternatively, the exit of the occupant from the vehicle may be determined by analyzing the image captured by an in-vehicle camera.

[Conclusion and Modification Examples]

Some example effects of the foregoing embodiments will now be described.

According to at least one of the foregoing embodiments, it is possible to appropriately determine a condition in which the occupant has exited the vehicle without turning off the vehicle drive system 1. This achieves automatic shutdown control without impairing safety and usability, and in turn reduces waste consumption of electric power and fuel. For example, the following effects may be provided.

In at least one of the foregoing embodiments of the technology, the power controller 2 may serve as a vehicle control apparatus for a hybrid vehicle provided with drive sources that include the engine 16 and the motor generator electrically powered by the battery. The power controller 2 includes the vehicle state evaluator 32, the exit evaluator 33, the shutdown evaluator 34, and the request output unit 35. The vehicle state evaluator 32 conducts evaluations of the state of the vehicle. The evaluations include at least the vehicle stop evaluation on the vehicle and the driving state evaluation on the engine. The vehicle state evaluator 32 evaluates whether the vehicle is stopped in the ready-on state in the vehicle stop evaluation. The exit evaluator 33 conducts the exit evaluation as to whether an exit of the occupant from the vehicle is detected. The shutdown evaluator 34 conducts a shutdown evaluation as to whether the vehicle drive system 1 is to be shut down on the basis of the results of the vehicle stop evaluation and the driving state evaluation by the vehicle state evaluator 32 and the result of the exit evaluation by the exit evaluator 33. The request output unit 35 outputs a shutdown request requesting for shutting down the vehicle drive system 1 on the basis of the result of the shutdown evaluation by the shutdown evaluator 34.

Accordingly, it is possible to properly shut down the vehicle drive system 1 even if the occupant forgets to shut down the vehicle drive system 1 before leaving from the vehicle and the vehicle is kept in the ready-on state. This reduces waste consumption of battery and excess engine driving or waste consumption of fuel.

The shutdown may be executed after verifying a safe condition where the vehicle is stopped, and the user would not have troubles due to stopping of operations of the vehicle. This prevents the safety and usability from being impaired.

In one embodiment, the power controller 2 may serve as a "vehicle control apparatus". Alternatively, another controller which is illustrated in FIG. 1, for example, or a non-illustrated controller may have the configuration illustrated in FIG. 3 and serve as a vehicle control apparatus.

Still alternatively, the shutdown control described above may be performed by multiple controllers in cooperation with each other.

According to at least one of the foregoing embodiments, the vehicle control apparatus which may be the power controller 2, for example, may further include the malfunction diagnostic unit 36 that performs the malfunction diagnosis of the vehicle. The request output unit 35 may output the request for shutting down the vehicle drive system 1 on the basis of the result of the shutdown evaluation by the shutdown evaluator 34 and the result of the malfunction diagnosis by the malfunction diagnostic unit 36.

The execution of the shutdown should be properly determined because shutting down the vehicle drive system 1 may terminate the traveling operations of the vehicle. For a proper determination, the malfunction diagnosis may be performed, and the shutdown request may be output on the basis of the result of the malfunction diagnosis. This ensures accuracy of the determination as to whether the shutdown is to be executed.

According to at least one of the foregoing embodiments, the request output unit 35 may refrain from outputting the shutdown request when a malfunction of the vehicle is detected by the malfunction diagnostic unit 36. In other words, the shutdown control may not be executed after the detection of a malfunction of the vehicle even when the requirements for the shutdown are satisfied.

A malfunction of any component of the vehicle can cause errors in the evaluations by the vehicle state evaluator 32 and the exit evaluator 33, and the evaluation by the shutdown evaluator 34 based on the evaluations by the vehicle state evaluator 32 and the exit evaluator 33. Accordingly, the shutdown request may not be output when a malfunction is detected, which prevents the vehicle drive system from being automatically shut down in inappropriate circumstances. This enhances the safety of the automatic shutdown control.

According to at least one of the foregoing embodiments, the malfunction diagnostic unit 36 may conduct the malfunction diagnosis on the basis of the input signals transmitted via the multiple wiring lines. For example, the malfunction diagnostic unit 36 may determine that a malfunction is detected when one or more of the signals Sig12, Sig13, Sig14, Sig15, Sig16, Sig17, and Sig18 indicates the occurrence of a malfunction. This prevents the shutdown control from being executed when a malfunction is detected in any component of the vehicle. In other words, the shutdown control according to at least one of the foregoing embodiments of the technology may properly incorporate the concept that the shutdown is not executed when an inappropriate factor is found that can hinder the execution of the shutdown.

Additionally, the malfunction diagnostic unit 36 may use different input signals transmitted via the wiring lines (e.g., the bus 21 and the wiring line 22) independent from each other per single detection element to be detected in the malfunction diagnosis of the vehicle. For example, the vehicle speed or vehicle-wheel speed may be evaluated by monitoring the results of the diagnoses indicated by the signal Sig14, which is the CAN signal transmitted from the traveling stability controller 4, and the signal Sig18, which is the detection signal transmitted from the vehicle-wheel speed sensor 15 via the wiring line 22. The difference between the results of the diagnoses indicated by the signals may be used to detect a malfunction.

In addition to the vehicle speed or vehicle-wheel speed, another detection element, such as the engine revolution, may also be detected in the malfunction diagnosis referring to the results of the diagnosis indicated by signals transmitted via the bus 21 and the wiring line 23.

In at least one of the foregoing embodiments of the technology, the vehicle state evaluator 32 may use the input signals transmitted via the wiring lines independent from each other to detect one detection element for the vehicle stop evaluation.

For example, the vehicle speed or vehicle-wheel speed, which is one of the detection elements for the vehicle stop evaluation, may be detected on the basis of the input signals (e.g., the signals Sig5 and Sig9) transmitted via the bus 21 and the wiring line 22.

The vehicle stop evaluation based on the signals transmitted via the multiple wiring lines, such as the CAN signal transmitted via the bus 21 and the detection signal transmitted from the vehicle-wheel speed sensor 15 via the signal line, ensures the detection per detection element for the vehicle stop evaluation, which improves the accuracy of the vehicle stop evaluation.

The switching to the P range, which is one of the detection elements for the vehicle stop evaluation, may be detected on the basis of the input signals transmitted via the bus 21 and the wiring line 24 (e.g., the signals Sig4 and Sig8).

This configuration also contributes to an improvement in accuracy of the vehicle stop evaluation.

According to at least one of the foregoing embodiments, the shutdown evaluator 34 may determine the shutdown execution on the basis of the multiple requirements for the shutdown.

For example, the shutdown request may be output when the first, second, third, and fourth requirements are satisfied: The first requirement may be a requirement that the vehicle is stopped in the ready-on state; the second requirement may be a requirement that the exit of the occupant from the vehicle is detected; the third requirement may be a requirement that an increase in the number of revolutions of the engine is detected, and the fourth requirement may be a requirement that a predetermined time has passed since the satisfaction of the first to third requirements. This allows the shutdown to be properly executed after the determination that the shutdown execution would not cause any trouble. For example, while the vehicle is traveling or an occupant is inside the vehicle, the shutdown may not be executed and the vehicle drive system 1 may be kept turned on for ensuring safety. Additionally, executing the shutdown in a safe condition makes it possible to reduce waste fuel consumption.

In at least one of the foregoing embodiments, the vehicle drive system 1 may be shut down when one or both of the first and second requirements are satisfied. In other words, the vehicle drive system 1 may be shut down when the vehicle is stopped in the ready-on state and/or when the occupant has exited the vehicle.

In a condition where the vehicle is stopped in the ready-on state (i.e., the first requirement is satisfied), the vehicle may not be traveling and thus the shutdown execution would not cause any trouble with safety.

Additionally, in a condition where the exit of the driver in the first embodiment or the occupant carrying the mobile device 20 in the second embodiment from the vehicle is detected (i.e., the second requirement is satisfied), the vehicle may not be traveling and thus the shutdown execution would not cause any trouble with safety.

Accordingly, the shutdown may be executed when one or both of the first and second requirements are satisfied.

In at least one of the foregoing embodiments, the shutdown may be executed when the third requirement that an increase in the number of revolutions of the engine is detected is satisfied in addition to the first and the second requirements.

The number of revolutions of the engine can be increased due to charging of the traveling battery while the vehicle is stopped in the ready-on state. This can often lead to waste fuel consumption. Accordingly, the engine revolution may be a useful factor for determining the shutdown execution.

According to at least one of the foregoing embodiments, the shutdown may be executed when the fourth requirement that a predetermined time has passed since the satisfaction of the multiple requirements for the shutdown is satisfied.

The shutdown may be executed when a condition where the first requirement that the vehicle is stopped in the ready-on state, the second requirement that the exit of the occupant from the vehicle is detected, and the third requirement that an increase in the number of revolution of the engine is detected are satisfied has held for, for example, ten minutes. This means that the multiple requirements for the shutdown may be satisfied in a continuous manner rather than in an instant manner. This achieves an appropriate determination of a condition in which the shutdown is to be executed.

Further, the shutdown may not be executed immediately after the satisfaction of the first, second, and third requirements and the determination that the shutdown execution would not cause any trouble. This prevents the usability for the driver or occupant from being impaired.

According to at least one of the foregoing embodiments, the shutdown evaluator 34 may determine to execute the shutdown when the multiple requirements for the shutdown are satisfied, and the request output unit 35 may output the control signal OUT2 to issue a shutdown preliminary notification in response to the satisfaction of some of the requirements for the shutdown.

For example, the occupant may be preliminarily notified of the possibility of the shutdown execution after the satisfaction of the first and second requirements for the shutdown.

This allows an occupant inside or around the vehicle to take an appropriate reaction to the preliminary notification of the shutdown. Optionally, the occupant may be allowed to cancel the shutdown execution through a predetermined operation when the shutdown is not necessary, for example.

For example, when the occupant wants the air conditioner to work while the vehicle is stopped, the occupant may be allowed to cancel the shutdown execution.

According to at least one of the foregoing embodiments, the request output unit 35 may output the control signal OUT2 to issue the shutdown preliminary notification when the exit of the occupant from the vehicle is detected.

This allows the shutdown preliminary notification to be issued at the timing when the occupant exits the vehicle. This warns or urges the occupant forgetting to shut down the vehicle drive system 1 to shut down the system immediately.

For example, the occupant outside the vehicle may be preliminarily notified of the shutdown by a sound or voice message generated from the vehicle exterior sound generator 10.

In another embodiment of the technology, the shutdown preliminary notification may be issued when another requirement is satisfied. For example, the shutdown preliminary notification may be issued when the fourth requirement is satisfied in the duration time evaluation after the satisfaction of the first, second, and third requirements.

According to at least one of the foregoing embodiments, the request output unit 35 may output the control signal OUT3 to issue a shutdown execution notification in response to the shutdown request.

The shutdown execution notification may be issued immediately before the execution of the shutdown, for example. This prevents the occupant inside or around the vehicle from misidentifying that a sudden shutdown occurs due to a malfunction or other troubles of the vehicle. Additionally, the shutdown preliminary notification may give the occupant time to cancel the shutdown execution, if needed.

The sound or the sound pattern of the buzzer that preliminarily notifies the shutdown may be different form those that notifies the execution of the shutdown for easy recognition by the user.

According to at least one of the foregoing embodiments, the request output unit 35 may not output the control signals OUT2 and OUT3 that request for the notification relevant to the shutdown when a malfunction is detected by the malfunction diagnostic unit 36.

It may be determined that executing the shutdown is inappropriate when a malfunction is detected. In such a case, a preliminary notification or execution notification of the shutdown, which is to be issued when the shutdown is going to be executed, may not be issued. This prevents improper notification to the occupant or user.

Note that, in case of a malfunction, a malfunction notification may be issued to notify the occupant of the malfunction. The malfunction may be notified by a sound or sound pattern different from the preliminary notification or execution notification of the shutdown.

According to at least one of the embodiments, the exit evaluator 33 may determine whether the exit of the occupant from the vehicle is detected on the basis of the multiple detection elements. For example, the exit of the occupant from the vehicle may be determined on the basis of detection elements, such as fixing and releasing of the safety belt, opening and closing of the driver's door, a load on the driver's seat, and an electric wave from a mobile device.

Detecting the exit of the occupant from the vehicle on the basis of the multiple detection elements improves accuracy in the exit evaluation.

Although some example configurations, example processing, and modification examples according to an embodiment of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the spirit of the technology. The technology is intended to include such modifications and alterations in so far as they fall within the scope of the appended claims or the equivalents thereof.

The vehicle state evaluator 32, the exit evaluator 33, the shutdown evaluator 34, the request output unit 35, and the malfunction diagnostic unit 36 illustrated in FIG. 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle state evaluator 32, the exit evaluator 33, the shutdown evaluator 34, the request output unit 35, and the malfunction diagnostic unit 36. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle state evaluator 32, the exit evaluator 33, the shutdown evaluator 34, the request output unit 35, and the malfunction diagnostic unit 36 illustrated in FIG. 3.

The invention claimed is:

1. A vehicle control apparatus, comprising:
a vehicle state evaluator configured to conduct evaluations of a state of a vehicle provided with drive sources including an engine and an electric motor, the evaluations of the state of the vehicle including a vehicle stop evaluation on the vehicle and a driving state evaluation on the engine, the vehicle state evaluator being configured to evaluate whether the vehicle is stopped in a ready-on state in the vehicle stop evaluation;
an exit evaluator configured to conduct an exit evaluation as to whether an exit of occupant from the vehicle is detected;
a shutdown evaluator configured to conduct a shutdown evaluation as to whether a vehicle drive system is to be shut down, the shutdown evaluation being conducted on a basis of results of the vehicle stop evaluation and the driving state evaluation by the vehicle state evaluator and a result of the exit evaluation by the exit evaluator;
a malfunction diagnostic unit that receives input signals regarding results of malfunction diagnosis of the vehicle; and
a request output unit configured to output a shutdown request on a basis of a result of the shutdown evaluation by the shutdown evaluator and a result of verification of the malfunction diagnosis outputted from the malfunction diagnostic unit, the shutdown request requesting for shutting down the vehicle drive system.

2. The vehicle control apparatus according to claim 1, wherein the request output unit is configured to refrain from outputting the shutdown request when the malfunction diagnostic unit detects a malfunction of the vehicle.

3. The vehicle control apparatus according to claim 1, wherein the malfunction diagnostic unit is configured to conduct the verification of the malfunction diagnosis of the vehicle on a basis of the input signals transmitted via multiple wiring lines.

4. The vehicle control apparatus according to claim 1, wherein the vehicle state evaluator is configured to detect a detection element used for the vehicle stop evaluation on a basis of the input signals transmitted via multiple wiring lines independent from each other.

5. The vehicle control apparatus according to claim 1, wherein the shutdown evaluator is configured to conduct the shutdown evaluation on a basis of multiple shutdown requirements.

6. The vehicle control apparatus according to claim 5, wherein the shutdown requirements include one or both of a first requirement that the vehicle is stopped in the ready-on state and a second requirement that the exit of the occupant from the vehicle is detected.

7. The vehicle control apparatus according to claim 6, wherein the shutdown requirements further includes a third requirement that an increase in a number of revolutions of the engine is detected.

8. The vehicle control apparatus according to claim 5, wherein the shutdown requirements further include a fourth requirement that a predetermined time has passed since a satisfaction of the first requirement, the second requirement, and the third requirement.

9. The vehicle control apparatus according to claim 1, wherein the shutdown evaluator is configured to determine that the vehicle drive system is to be shut down when shutdown requirements are satisfied, and
wherein the request output unit is further configured to output a control signal directed to issue a shutdown preliminary notification when at least one of the shutdown requirements are satisfied.

10. The vehicle control apparatus according to claim 1, wherein the request output unit is configured to output a control signal directed to issue a shutdown preliminary notification when the exit of the occupant from the vehicle is detected.

11. The vehicle control apparatus according to claim 1, wherein the request output unit is further configured to output a control signal directed to issue a shutdown execution notification when outputting the shutdown request.

12. The vehicle control apparatus according to claim 1, wherein the request output unit is configured to refrain from outputting a control signal directed to issue a shutdown execution notification when the malfunction diagnostic unit detects a malfunction.

13. The vehicle control apparatus according to claim 1, wherein the exit evaluator is configured to conduct the exit evaluation as to whether the exit of the occupant from the vehicle is detected on a basis of multiple detection elements.

14. A vehicle control apparatus, comprising
a circuitry configured to:
conduct evaluations of a state of a vehicle provided with drive sources including an engine and an electric motor, the evaluations of the state of the vehicle including a vehicle stop evaluation as to whether the vehicle is stopped in a ready-on state and a driving state evaluation on the engine;
conduct an exit evaluation as to whether an exit of the occupant from the vehicle is detected;
conduct a shutdown evaluation as to whether a vehicle drive system is to be shut down, the shutdown evaluation being conducted on a basis of results of the vehicle stop evaluation, the driving state evaluation, and the exit evaluation;
receive input signals regarding results of malfunction diagnosis of the vehicle; and
output a shutdown request on a basis of a result of the shutdown evaluation and a result of verification of the malfunction diagnosis, the shutdown request requesting for shutting down the vehicle drive system.

15. The vehicle control apparatus according to claim 14, wherein the circuity refrains from outputting the shutdown request when the result of the verification of the malfunction diagnosis includes a malfunction of the vehicle.

16. The vehicle control apparatus according to claim 14, wherein the circuity refrains from outputting a control signal directed to issue a shutdown execution notification when a malfunction is detected.

17. The vehicle control apparatus according to claim 1, further including a processor coupled to a memory storing instructions to cause the processor to function as the vehicle state evaluator, the exit evaluator, the shutdown evaluator, the malfunction diagnostic unit, and the request output unit.

18. The vehicle control apparatus according to claim 1, wherein the malfunction diagnostic unit receives input signals, each indicating an abnormality diagnosis, from corresponding controllers.

19. The vehicle control apparatus according to claim 18, wherein the malfunction diagnostic unit verifies whether the corresponding controllers are in malfunction on a basis of the input signals.

20. The vehicle control apparatus according to claim 1, wherein the malfunction diagnostic unit outputs to the request output unit a signal indicative of no malfunction when all of the input signals are verified to be normal, and
wherein the malfunction diagnostic unit outputs to the request output unit another signal indicative of a malfunction when at least one of the input signals is verified to be abnormal.

* * * * *